M. F. MIÉVILLE.
CARBURETER.
APPLICATION FILED OCT. 31, 1908.

938,011.

Patented Oct. 26, 1909.

Witnesses:-
C. M. Crawford
E. Schallinger

Inventor:-
Mortimer F. Miéville
by B. Singer
Attorney

UNITED STATES PATENT OFFICE.

MORTIMER FREDERICK MIÉVILLE, OF CHICHESTER, ENGLAND.

CARBURETER.

938,011.  Specification of Letters Patent.  Patented Oct. 26, 1909.

Application filed October 31, 1908.  Serial No. 460,553.

*To all whom it may concern:*

Be it known that I, MORTIMER FREDERICK MIÉVILLE, a subject of the King of Great Britain, of Summersdale, Chichester, in the county of Sussex, England, engineer, have invented a new and useful Improvement in Carbureters, of which the following is a specification.

My invention relates to apparatus for the production of carbureted air and more particularly to that class of apparatus provided with a series of perforated tubes, some, or all of which perforations are arranged below the surface of the volatile liquid.

The present invention has for its object certain improvements in apparatus of the type referred to by which the air is more thoroughly impregnated with carbureted air to the required extent, the whole apparatus being simple, cheap and effective.

Figure 1:
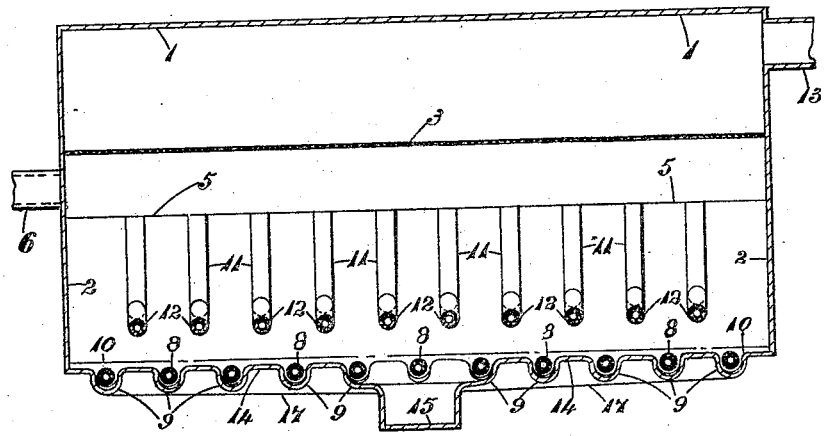
Figure 2:
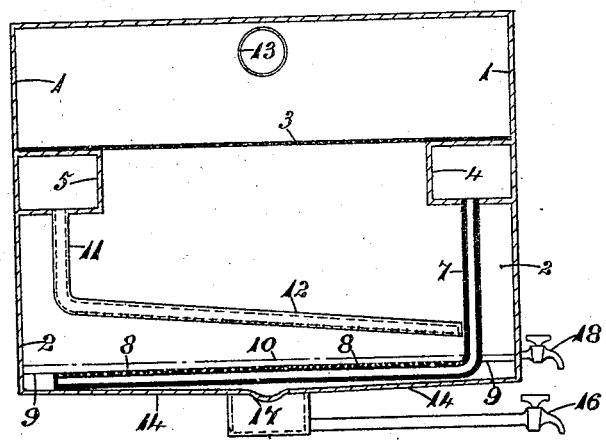

The accompanying drawing is an illustration of one convenient form of carbureter constructed in accordance with the present improvements, Figure 1 being a longitudinal section thereof, and Fig. 2 a transverse section of the same.

I construct the improved carbureter as shown preferably of copper and rectangular in form, this vessel being divided longitudinally into upper and lower compartments 1 and 2 respectively by a perforated gauze partition 3. Immediately beneath this partition 3 I arrange on each side a circular, square, or other compartment or passage extending for the full length of the lower or carbureting chamber 2. These compartments or passages, 4, 5, are each provided at one end thereof with an air inlet 6, Fig. 1, from the blower—not shown—under the control of an adjustable valve or valves for regulating the air supply.

From one of the air compartments or passages 4 above described a series of vertical pipes 7 are arranged at short intervals apart which conduct the air to the bottom of the carbureter 2, and the pipes 7 are then turned at right angles across the width of the carbureting chamber 2, their lower horizontal parts 8, 8, being perforated as shown. The perforated pipes 8, 8, are laid in corresponding gutters or corrugations 9, 9, formed in the bottom of the carbureter 2 and are all horizontally level—as illustrated in Fig. 2— so that they are just covered with spirit—indicated by the dot and dash lines 10—when the apparatus is in use, the air leaving the perforations coming into direct contact with and passing through said spirit 10 and at the same time agitating the latter, a rich gas being thus formed. The air compartment 5 on the opposite side of the carbureting chamber is furnished with a number of vertical pipes 11, 11, similar to those already described but of less length and their lower ends 12, 12, are bent outward in a downwardly sloping direction so as to lie over the surface of the spirit as shown; or, an equal number of tubes 7, 11, may be employed and arranged so that the lower series of horizontal pipes 8, 8, are below the upper series 12, 12, as will be readily understood without further illustration. These pipes 12, 12, are formed with perforations in their lower part by which air is blown downward toward the first series of tubes, 8, 8, and being practically free from hydrocarbon dilutes the carbureted air rising from said lower tubes 8, 8. The gas thus formed in the carbureter 2 passes through the gauze partitions 3 to the upper chamber 1 and from thence is conducted to the service pipe or gasometer by a pipe 13, in the usual way.

It is important that the upper series of tubes 12, 12, should slope down as described to bring the supply of air nearer the surface of the spirit. Where more gas is consumed more air becomes necessary, and the greater the volume of air the quicker the spirit 10 is evaporated and consequently the lower the temperature.

The bottom 14 of the carbureter 2 described is curved or inclined downward to its center as shown to a central well 15 for the purpose of collecting any foreign substances, such as water, dust, or other impurities, which can be drawn off by a cock 16, and the necessity for emptying the carbureter for cleaning purposes is thus obviated.

17 is a cross corrugation connecting the lower central part of the corrugations 9, 9, thus completing the perfect draining system to the central well 15 above described.

A pet cock 18 is also arranged from the carbureter 2 slightly above the lower series of tubes 8, 8, for the purpose of ascertaining the height of the petrol 10.

The details of construction of the apparatus may be varied to suit different circumstances.

Apparatus for the production of carbureted air constructed according to my invention is extremely effective in operation, cheap in construction, and not likely to get out of order.

What I claim as my invention and desire to secure by Letters Patent, is:—

1. The combination in apparatus for the production of carbureted air of a chamber longitudinally divided into upper and lower compartments by a horizontally disposed perforated partition, air-inlet passages arranged below said partition at opposite sides of the carbureter and a series of vertically depending pipes situated at short intervals apart below the air inlet passages, the lower ends of the pipes on one side being perforated and horizontally turned to lie along the bottom of the carbureter, while the lower ends of those on the opposite side are perforated and outwardly bent in a downwardly sloping direction, all substantially as set forth.

2. In a carbureter, the combination of a chamber provided with a plurality of air inlets and an outlet and adapted to contain a free body of liquid to be carbureted, and a series of pipes connected with each inlet, one series having portions lying adjacent the bottom of the casing and submerged below the level of the liquid and provided with perforations discharging upwardly therethrough, the other series of pipes having portions lying above the level of the liquid and above said submerged portions and provided with perforations discharging downwardly toward the liquid and toward the upwardly discharging vapor from said submerged portions.

3. In a carbureter, the combination of a chamber adapted to contain the liquid to be carbureted and provided on its bottom wall with a plurality of grooves, said chamber having air passages, a series of tubes connected with one of said passages and lying in said grooves and discharging air into the liquid below the level thereof, and a series of tubes connected with another air passage and discharging air toward and above the level of the liquid.

In witness whereof I have hereunto set my hand in the presence of two witnesses.

MORTIMER FREDERICK MIÉVILLE.

Witnesses:
H. D. JAMESON,
TH. RAND.